(12) United States Patent
Kawasaki et al.

(10) Patent No.: US 8,265,647 B2
(45) Date of Patent: Sep. 11, 2012

(54) COMMUNICATION TERMINAL AND DEVICE

(75) Inventors: Yoshihiro Kawasaki, Kanagawa (JP);
Kazuo Kawabata, Kanagawa (JP);
Yoshiharu Tajima, Kanagawa (JP);
Hideto Furukawa, Kanagawa (JP);
Kazuhisa Obuchi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 293 days.

(21) Appl. No.: 12/234,266

(22) Filed: Sep. 19, 2008

(65) Prior Publication Data
US 2009/0011711 A1    Jan. 8, 2009

Related U.S. Application Data

(63) Continuation of application No. PCT/JP2006/306575, filed on Mar. 29, 2006.

(51) Int. Cl.
*H04W 72/00*    (2009.01)

(52) U.S. Cl. ............... 455/452.2; 455/39; 455/67.11; 455/509; 455/450; 455/513; 375/132; 370/208; 370/294; 370/329

(58) Field of Classification Search ............ 455/39, 455/67.11, 509, 513, 450, 452.2; 375/132; 370/208, 294, 329

See application file for complete search history.

(56) References Cited

U.S. PATENT DOCUMENTS

| | | | |
|---|---|---|---|
| 5,767,913 A * | 6/1998 | Kassatly ............... | 375/240.18 |
| 6,625,222 B1 * | 9/2003 | Bertonis et al. ............ | 375/259 |
| 6,850,186 B2 * | 2/2005 | Hellsten ................. | 342/93 |
| 6,928,062 B2 | 8/2005 | Krishnan et al. | |
| 6,940,845 B2 | 9/2005 | Benveniste | |
| 7,020,110 B2 | 3/2006 | Walton et al. | |
| 7,042,857 B2 | 5/2006 | Krishnan et al. | |
| 7,436,758 B2 * | 10/2008 | Suh et al. ...................... | 370/203 |
| 2002/0122410 A1 * | 9/2002 | Kulikov et al. ............... | 370/349 |
| 2002/0150329 A1 * | 10/2002 | Ahn et al. ................. | 385/24 |
| 2002/0163879 A1 * | 11/2002 | Li et al. ......................... | 370/200 |

(Continued)

FOREIGN PATENT DOCUMENTS

EP    0901243    3/1999

(Continued)

OTHER PUBLICATIONS

English Translation of International Search Report for corresponding International Application No. PCT/JP2006/306575 Mar. 29, 2006.

(Continued)

*Primary Examiner* — April G Gonzales
(74) *Attorney, Agent, or Firm* — Fujitsu Patent Center

(57) ABSTRACT

The present invention enables assignment to a terminal a sub-band having satisfactory communication quality. A reference-signal reception unit receives from a terminal a reference signal spreading over sub-bands. A communication-quality measurement unit measures the communication quality of each of the sub-bands on the basis of the reference signal. A sub-band assignment unit assigns one of the sub-bands to the terminal on the basis of the communication quality, for the terminal to perform wireless communication with the communication device. A reference-signal transmission unit transmits to the communication device a reference signal spreading over the sub-bands. A sub-band-assignment-information reception unit receives information on one of the sub-bands which is assigned to the terminal by the communication device on the basis of the reference signal. A data transmission unit transmits data to the communication device through the sub-band assigned to the terminal.

7 Claims, 15 Drawing Sheets

U.S. PATENT DOCUMENTS

| | | | |
|---|---|---|---|
| 2003/0227889 A1* | 12/2003 | Wu et al. | 370/335 |
| 2004/0125772 A9* | 7/2004 | Wu et al. | 370/335 |
| 2004/0130480 A1* | 7/2004 | Hellsten | 342/59 |
| 2005/0088960 A1* | 4/2005 | Suh et al. | 370/208 |
| 2005/0232135 A1* | 10/2005 | Mukai et al. | 370/208 |
| 2006/0013285 A1* | 1/2006 | Kobayashi et al. | 375/132 |
| 2006/0193338 A1* | 8/2006 | Zheng et al. | 370/437 |
| 2007/0165576 A1* | 7/2007 | Wang et al. | 370/335 |
| 2010/0046945 A1* | 2/2010 | Lee et al. | 398/68 |

FOREIGN PATENT DOCUMENTS

| | | |
|---|---|---|
| EP | 1555782 | 7/2005 |
| JP | 2001-217761 | 8/2001 |
| JP | 2001-217761 | 8/2002 |
| JP | 2002-218526 | 8/2002 |
| JP | 2004-529527 | 9/2004 |
| JP | 2005-294895 | 10/2005 |
| JP | 2006-33480 | 2/2006 |
| WO | 02/058300 | 7/2002 |
| WO | WO-2006/124042 | 11/2006 |

OTHER PUBLICATIONS

Extended European Search Report issued by EPO and corresponding to EP 06730523.5 on Mar. 19, 2012.

\* cited by examiner

COMMUNICATION TERMINAL AND DEVICE

This application is a continuing application, filed under 35 U.S.C. §111(a), of International Application PCT/JP2006/306575, filed Mar. 29, 2006.

BACKGROUND OF THE INVENTION

1. Field of the Invention

The present invention relates to a communication device and a terminal, and in particular to a communication device and a terminal which perform wireless communication by use of EUTRAN.

2. Description of the Related Art

Currently, EUTRAN (Evolved UTRAN: Evolved UMTS Terrestrial Radio Access Network) is under study for a system in the next generation ahead of 3GPP (3rd Generation Partnership Project), and a scheme in which a single carrier is used in the uplink is in the course of being adopted. Specifically, the entire transmission bandwidth of the uplink is divided into a plurality of sub-bands, and each sub-band is occupied by a single carrier. Each single-carrier signal is assumed to be generated by FFT/IFFT (fast Fourier transformation/inverse fast Fourier transformation) processing, so that each single-carrier signal is composed of a plurality of subcarriers. Each terminal transmits data through one of the sub-bands in the uplink. However, basically the base station determines which one of the sub-bands each terminal should use.

The sub-band to be used is changed according to variations in the communication quality (wireless link quality). It is necessary for each terminal to have the base station determine which one of the sub-bands the terminal can use, and how long the terminal can use the sub-band, before uplink data transmission. (That is, wireless resource assignment is necessary.) Therefore, each terminal transmits to the base station a request signal for wireless resource assignment in accordance with a random access protocol (for example, the Slotted ALOHA protocol), or a reservation-type transmission protocol using a wireless resource assigned to the terminal by the base station.

However, each terminal transmits a pilot (reference signal) through only the sub-band to be used in data transmission, instead of the entire transmission bandwidth. Then, the base station evaluates the communication quality of the sub-band used in the transmission of the reference signal, on the basis of the reference signal. However, since each terminal does not transmit the reference signal through the entire transmission bandwidth, it is impossible to assign a sub-band which has communication quality suitable for each terminal. The base station can merely recognize the degree of the communication quality of the sub-band for each terminal. Therefore, it is impossible to perform frequency scheduling in the uplink.

Conventionally, some methods and devices for assigning channels in a mobile communication system using a plurality of different multiple access techniques have been proposed, where the methods and devices require neither complex algorithm nor massive calculation, and wireless frequencies can be effectively utilized. (See, for example, Japanese Unexamined Patent Publication No. 2002-218526).

As explained above, assignment of an uplink sub-band having satisfactory communication quality to each terminal is conventionally impossible.

SUMMARY OF THE INVENTION

The present invention is made in view of the above problems, and the object of the present invention is to provide a communication device which can perform assignment of a sub-band having satisfactory communication quality, and a terminal which can perform communication through a sub-band having satisfactory communication quality.

To accomplish the above object, the present invention provides a communication device for performing wireless communication with a terminal. The communication device comprises: a reference-signal reception unit which receives from the terminal a reference signal spreading over a plurality of sub-bands; a communication-quality measurement unit which measures communication quality of each of the plurality of sub-bands on a basis of the reference signal; and a sub-band assignment unit which performs assignment of one of the plurality of sub-bands to the terminal on a basis of the communication quality, for the terminal to perform the wireless communication with the communication device.

Also, to accomplish the above object, the present invention provides a terminal for performing wireless communication with a communication device. The terminal comprises a reference-signal transmission unit which transmits to the communication device a reference signal spreading over a plurality of sub-bands; a sub-band-assignment-information reception unit which receives sub-band-assignment information on one of the plurality of sub-bands assigned to the terminal by the communication device on a basis of the reference signal; and a data transmission unit which transmits data to the communication device through the assigned one of the plurality of sub-bands.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

Figure 1:
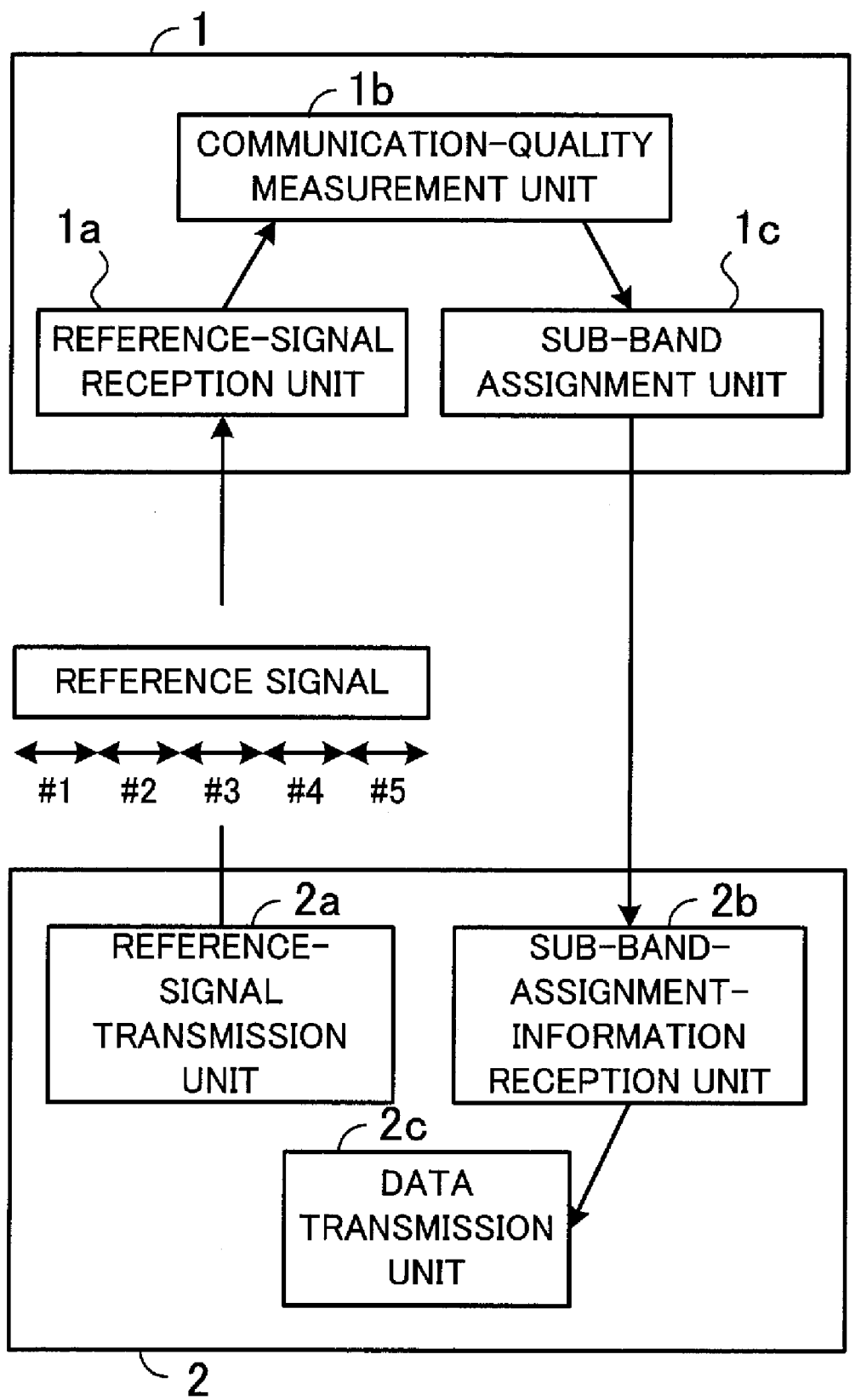
FIG. 1 is a diagram briefly illustrating a communication device and a terminal.

Hereinbelow, the principle of the present invention is explained in detail with reference to drawings. As illustrated in FIG. 1, the communication device 1 comprises a reference-signal reception unit 1a, a communication-quality measurement unit 1b, and a sub-band assignment unit 1c, and the terminal 2 comprises a reference-signal transmission unit 2a, a sub-band-assignment-information reception unit 2b, and a data transmission unit 2c. The communication device 1 is, for example, a base-station device which is arranged in a base station and performs wireless communication with the terminal 2 by use of EUTRAN.

In the communication device, the reference-signal reception unit 1a receives from the terminal 2 a reference signal spreading over a plurality of sub-bands #1 to #5. The reference signal is, for example, a pilot signal. Although the five sub-bands are illustrated in the example of FIG. 1, several tens of sub-bands may be used in practical systems.

The communication-quality measurement unit 1b measures the communication quality of each of the plurality of sub-bands #1 to #5 on the basis of the reference signal received by the reference-signal reception unit 1a. The communication quality is represented by, for example, the ratio of desired signal power to noise power, or the like. In some cases, the interfered signal power is included in the noise power.

The sub-band assignment unit 1c assigns one of the plurality of sub-bands #1 to #5 to the terminal 2 on the basis of the communication quality measured by the communication-quality measurement unit 1b, for the terminal 2 to perform wireless communication with the communication device 1. For example, the sub-band assignment unit 1c assigns to the terminal 2 one of the sub-bands #1 to #5 which has the highest communication quality for the terminal 2, and transmits to the terminal 2 sub-band-assignment information on the sub-band assigned to the terminal 2.

In the terminal 2, the reference-signal transmission unit 2a transmits to the communication device 1 the reference signal spreading over the plurality of sub-bands #1 to #5.

The sub-band-assignment-information reception unit 2b receives the sub-band-assignment information on the one of the plurality of sub-bands #1 to #5 assigned to the terminal 2 by the communication device 1 on the basis of the reference signal.

The data transmission unit 2c transmits data to the communication device 1 through the sub-band assigned to the terminal 2.

As explained above, the communication device 1 receives from the terminal 2 the reference signal spreading over the plurality of sub-bands #1 to #5, measures the communication quality of each of the plurality of sub-bands #1 to #5, and assigns one of the plurality of sub-bands #1 to #5 to the terminal 2 on the basis of the measured communication quality. Therefore, the communication device 1 can assign to the terminal 2 one of the sub-bands #1 to #5 having satisfactory communication quality.

In addition, the terminal 2 transmits to the communication device 1 the reference signal spreading over the plurality of sub-bands #1 to #5, receives the sub-band-assignment information on the sub-band assigned by the communication device 1 on the basis of the reference signal, and transmits data to the communication device 1 through the sub-band assigned by the communication device 1. Therefore, the terminal 2 can perform communication with the communication device 1 through a sub-band having satisfactory communication quality.

Next, the first embodiment of the present invention is explained in detail with reference to drawings.

Figure 2:
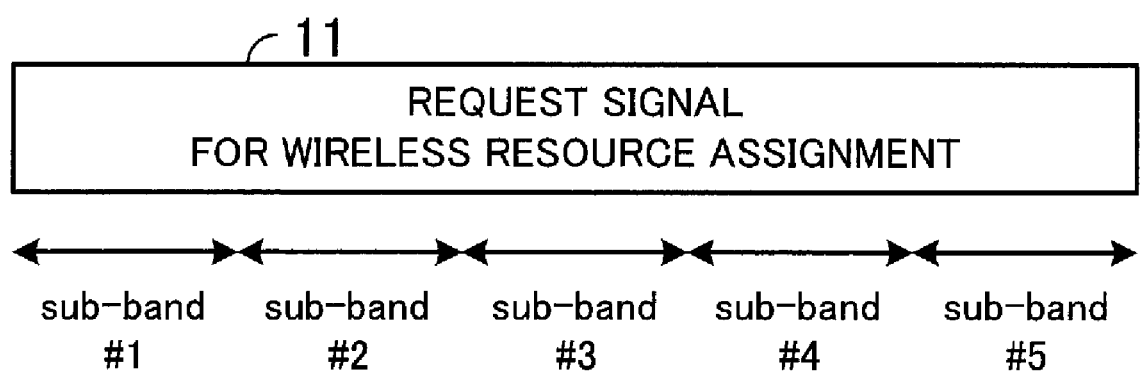
FIG. 2 is a diagram provided for explaining a request signal for wireless resource assignment.

FIG. 2 is a diagram provided for explaining a request signal for wireless resource assignment. The request signal for wireless resource assignment 11 illustrated in FIG. 2 shows a signal transmitted from a terminal to a base station (a communication device in the base station). The request signal for wireless resource assignment 11 is transmitted from a terminal to the base station in accordance with a random access protocol (for example, the Slotted ALOHA protocol), or a reservation-type transmission protocol (which uses a wireless resource individually assigned to each terminal by the base station). The entire bandwidth of the request signal for wireless resource assignment 11 illustrated in FIG. 2 is divided into the sub-bands #1 to #5. Although the five sub-bands are illustrated in the example of FIG. 2, several tens of sub-bands may be used in practical systems.

The request signal for wireless resource assignment 11 is explained in detail below.

Figure 3:
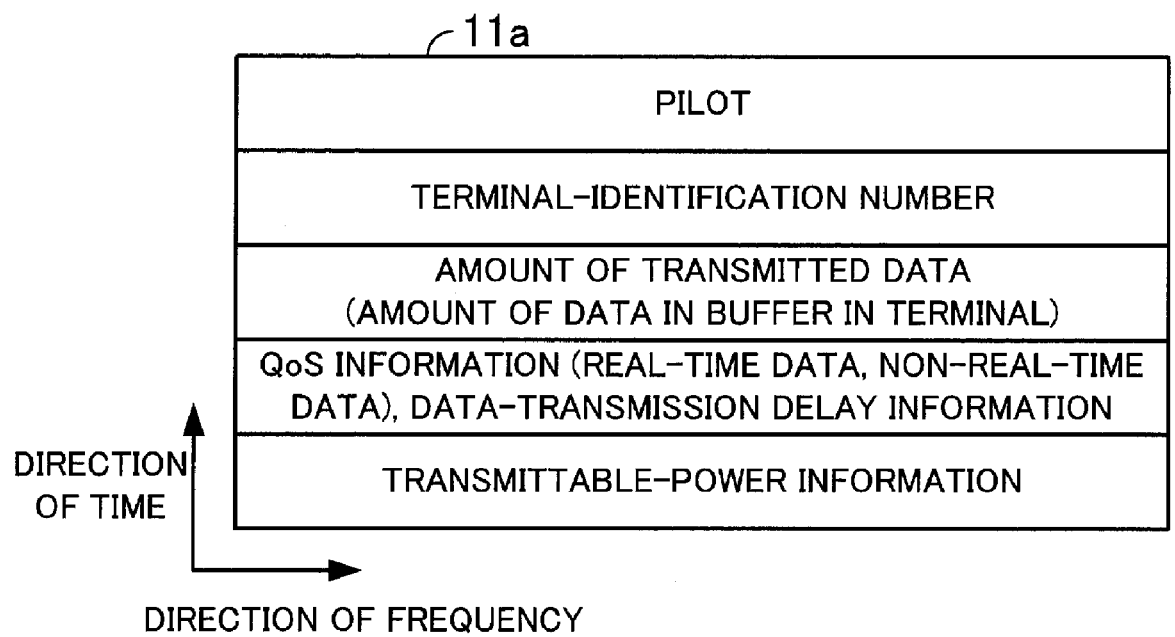
FIG. 3 is a diagram illustrating an example of a data structure of the request signal for wireless resource assignment.

FIG. 3 is a diagram illustrating an example of a data structure of the request signal for wireless resource assignment. As illustrated in FIG. 3, the request signal for wireless resource assignment 11a contains, for example, information on transmittable power, QoS (quality of service) information, information on data-transmission delay, the amount of transmitted data, the terminal identification number, and the pilot. The information on transmittable power indicates the maximum transmittable signal power and the currently transmitted signal power of the terminal. The QoS information indicates whether the data is real-time data or non-real-time data. The information on data-transmission delay indicates the delay in data transmission, and includes the data waiting time in a waiting state before transmission, the transmission delay time caused by occurrence of retransmission, and the like. The amount of transmitted data indicates the amount of data (to be transmitted) in a buffer in the terminal. The terminal identification number is a number assigned for the base station to identify the terminal. The pilot is a reference signal for the base station to evaluate the communication quality of each sub-band. Further, the pilot is also used for measurement of a wireless channel state (i.e., the variations in the amplitude and phase in the reference signal after wireless transmission), which is necessary when the request signal for wireless resource assignment is demodulated.

Each of the information on transmittable power, the QoS information, the information on data-transmission delay, the amount of transmitted data, the terminal identification number, and the pilot is transmitted to the base station by using the entire bandwidth. In FIG. 3, the horizontal direction corresponds to the spread of the frequency, and the vertical direction corresponds to the progress of the time.

Another example of the data structure of the request signal for wireless resource assignment 11 is explained in detail below.

Figure 4:
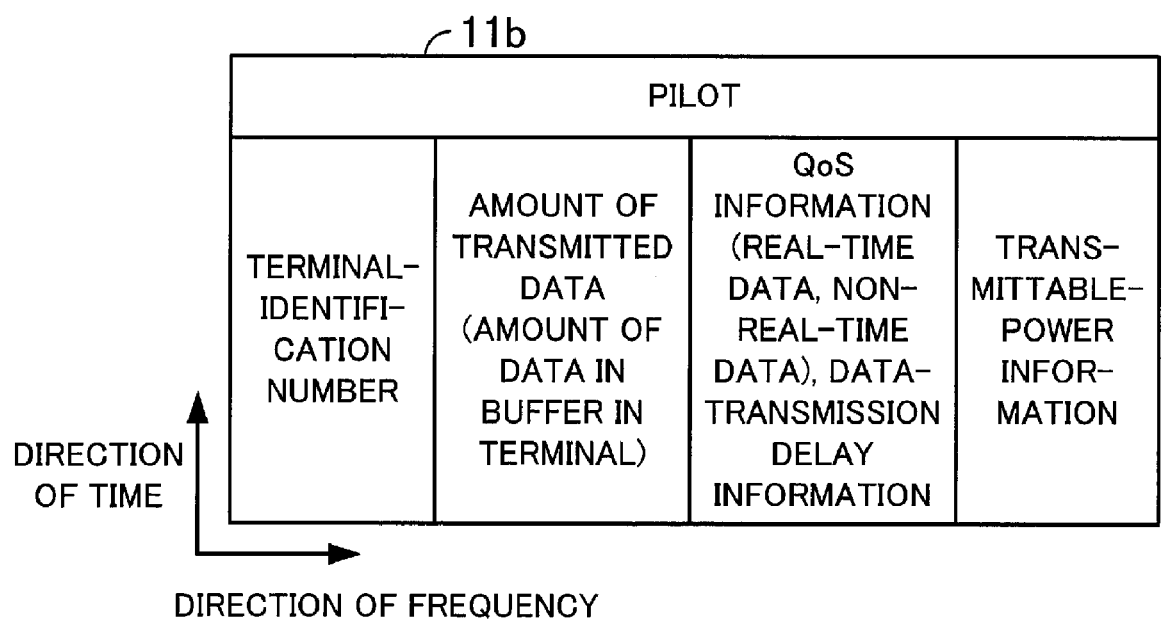
FIG. 4 is a diagram illustrating another example of a data structure of the request signal for wireless resource assignment.

FIG. 4 is a diagram illustrating another example of the data structure of the request signal for wireless resource assignment. As illustrated in FIG. 4, the request signal for wireless resource assignment 11b contains the information on transmittable power, the QoS information, the information on data-transmission delay, the amount of transmitted data, the terminal identification number, and the pilot, which are similar to the example of FIG. 3.

Although the pilot in the example of FIG. 4 is transmitted by using the entire bandwidth, in contrast to the example of FIG. 3, the information on transmittable power, the QoS information, the information on data-transmission delay, the amount of transmitted data, and the terminal identification number are altogether transmitted from the terminal to the base station by using the entire bandwidth in the example of FIG. 4. In FIG. 4, the horizontal direction corresponds to the spread of the frequency, and the vertical direction corresponds to the progress of the time.

Next, an assignment signal for transmitting sub-band-assignment information from the base station to the terminal is explained in detail below.

When the base station receives from the terminal the request signal for wireless resource assignment 11, the base station measures the communication quality (such as SNR (signal to noise ratio) or SINR (signal to interference-plus-noise ratio)) of each sub-band on the basis of the pilot contained in the received request signal for wireless resource assignment 11. The base station assigns a sub-band having communication quality satisfactory for the terminal which transmits the request signal for wireless resource assignment 11, on the basis of the communication quality of each sub-band. The base station sends information on the assigned sub-band to the terminal by use of the sub-band-assignment signal so that the terminal can perform uplink data transmission through the assigned sub-band.

Figure 5:
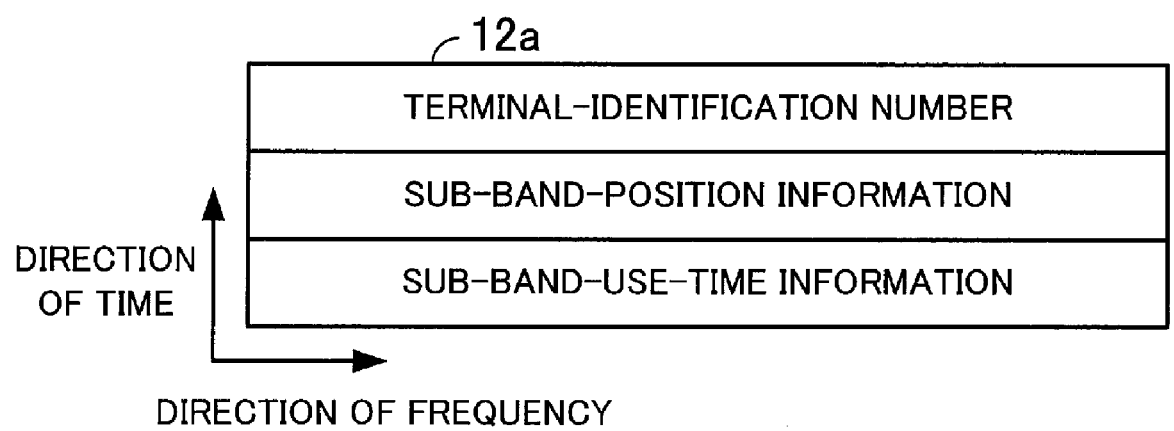
FIG. 5 is a diagram illustrating an example of a data structure of a sub-band-assignment signal.

FIG. 5 is a diagram illustrating an example of a data structure of the sub-band-assignment signal. As illustrated in FIG. 5, the sub-band-assignment signal 12a contains sub-band-use-time information, sub-band-position information, and a terminal identification number. The sub-band-use-time information is information indicating how long the terminal can perform uplink data transmission by use of the assigned sub-band. The sub-band-position information is information indicating the position of the sub-band which the base station assigns to the terminal. The terminal identification number in the sub-band-assignment signal 12a is a terminal identification number indicating the terminal to which the sub-band-assignment information is transmitted.

In FIG. 5, the horizontal direction corresponds to the spread of the frequency, and the vertical direction corresponds to the progress of the time.

Another example of the data structure of the sub-band-assignment signal is explained below.

Figure 6:
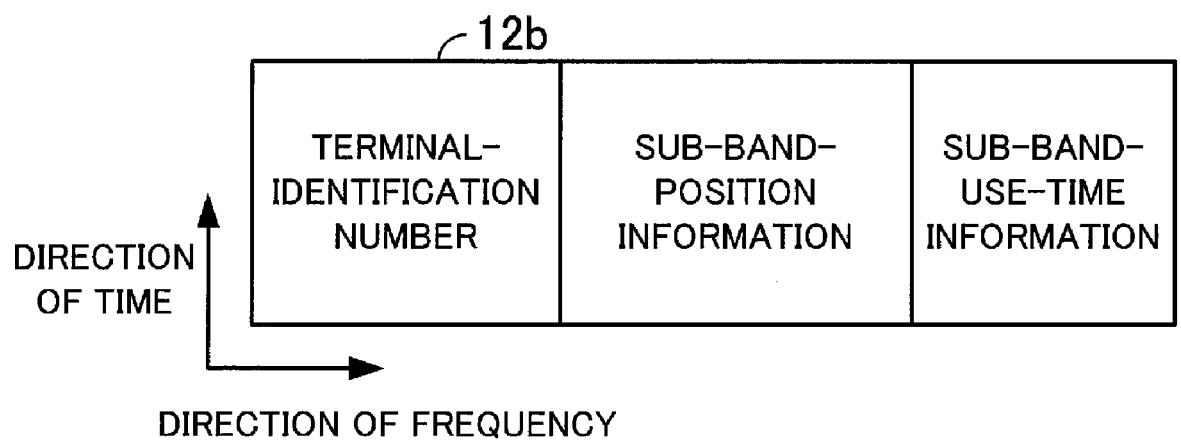
FIG. 6 is a diagram illustrating another example of a data structure of the sub-band-assignment signal.

FIG. 6 is a diagram illustrating another example of the data structure of the sub-band-assignment signal. As illustrated in FIG. 6, the sub-band-assignment signal 12b contains sub-band-use-time information, the sub-band-position information, and the terminal identification number, which are similar to the example of FIG. 5.

In FIG. 6, the horizontal direction corresponds to the spread of the frequency, and the vertical direction corresponds to the progress of the time.

Next, assignment of a sub-band to a terminal by the base station is explained below.

Figure 7:
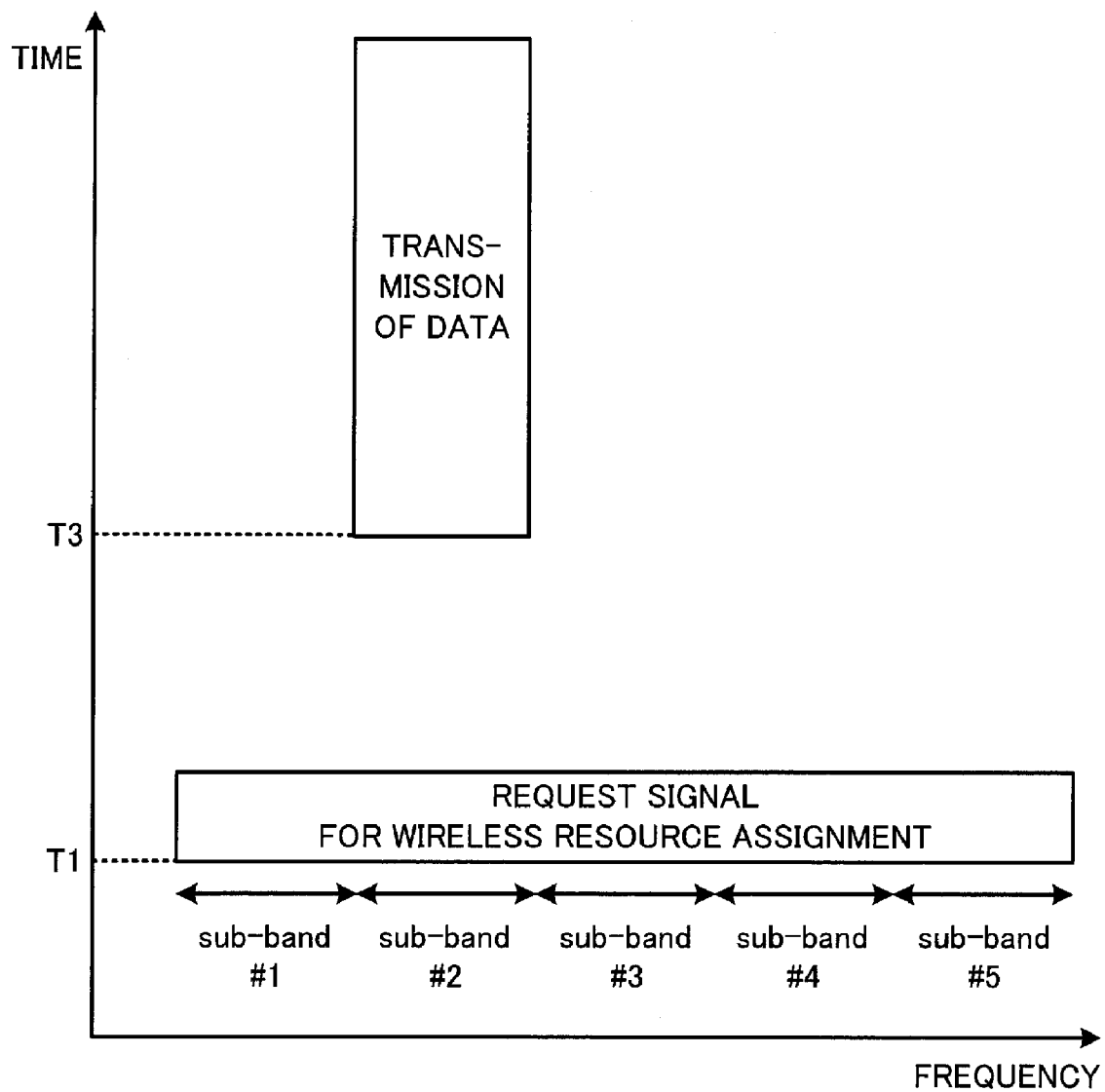
FIG. 7 is a diagram provided for explaining assignment of a sub-band to a terminal by a base station.

FIG. 7 is a diagram provided for explaining assignment of a sub-band to a terminal by the base station. FIG. 7 shows relationships between the timings and the frequencies of signals (including data) transmitted from a terminal to the base station. In FIG. 7, the abscissa corresponds to the frequency, and the ordinate corresponds to the time.

The terminal transmits the request signal for wireless resource assignment to the base station at time T1, where the request signal for wireless resource assignment spreads over the entire bandwidth. The request signal for wireless resource assignment can be divided into the sub-bands #1 to #5 as illustrated in FIG. 7. FIG. 7 shows an exemplary case where the number of the sub-bands is five.

When the base station receives the request signal for wireless resource assignment from the terminal, the base station measures the communication quality of the signal in each of the sub-bands #1 to #5 on the basis of the pilot signal, which is contained in the request signal for wireless resource assignment and spreads over the entire bandwidth of the request signal for wireless resource assignment. The base station assigns a sub-band having satisfactory communication quality to the terminal which transmits the request signal for wireless resource assignment. The base station sends information on the sub-band assigned to the terminal, by transmitting a sub-band-assignment signal.

When the terminal receives the sub-band-assignment signal transmitted from the base station, the terminal transmits data to the base station by using the assigned sub-band, which is indicated by information contained in the sub-band-assignment signal. FIG. 7 shows an example where the sub-band #2 is assigned to the terminal.

Next, transmission and reception of data by the terminal and the base station illustrated in FIG. 7 are explained with reference to a sequence diagram.

Figure 8:
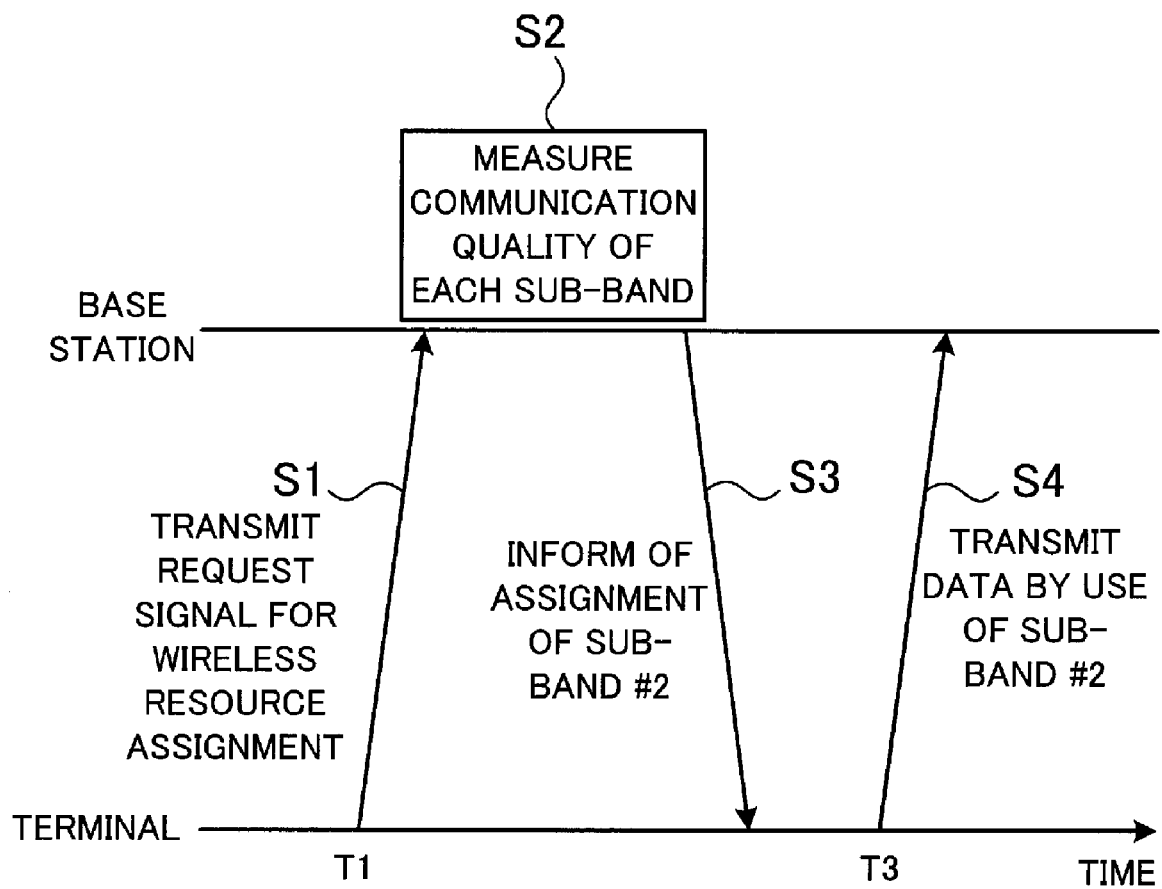
FIG. 8 is a sequence diagram of a terminal and a base station.

FIG. 8 is a sequence diagram of the terminal and the base station.

<Step S1> The terminal transmits a request signal for wireless resource assignment to the base station at time T1.

<Step S2> The base station measures the communication quality of the signal in each of the sub-bands #1 to #5 on the basis of the pilot, which is contained in the request signal for wireless resource assignment received from the terminal and spreads over the entire bandwidth of the request signal for wireless resource assignment. The base station assigns a sub-band having satisfactory communication quality to the terminal which transmits the request signal for wireless resource assignment. In this explanation of the sequence, it is assumed that the base station assigns the sub-band #2 to the terminal as mentioned before.

<Step S3> The base station informs the terminal of the sub-band #2 assigned to the terminal, by transmitting a sub-band-assignment signal.

<Step S4> The terminal receives the sub-band-assignment signal from the base station. The terminal recognizes the assignment of the sub-band #2 on the basis of information contained in the sub-band-assignment signal, and transmits data to the base station by use of the assigned sub-band #2.

As explained above, the communication device (i.e., the base station device) receives from the terminal the reference signal which spreads over the plurality of sub-bands, and measures the communication quality of each of the plurality of sub-bands. Then, the base station assigns to the terminal one of the plurality of sub-bands on the basis of the measured communication quality. Therefore, it is possible to assign to the terminal a sub-band having satisfactory communication quality.

In addition, the terminal transmits to the communication device the reference signal which spreads over the plurality of sub-bands, and receives the sub-band-assignment information containing the information on the sub-band which is assigned by the communication device on the basis of the reference signal. Then, the terminal transmits data to the communication device through the sub-band assigned by the communication device. Thus, the terminal can perform communication with the communication device through a sub-band having satisfactory communication quality.

Further, since the sub-band having satisfactory communication quality is assigned, it is possible to expect improvement in the data throughput in the uplink from the terminal.

Although the plurality of sub-bands used by the request signal for wireless resource assignment continuously range in the explained example, the plurality of sub-bands used by the request signal for wireless resource assignment may discontinuously range.

Figure 9:
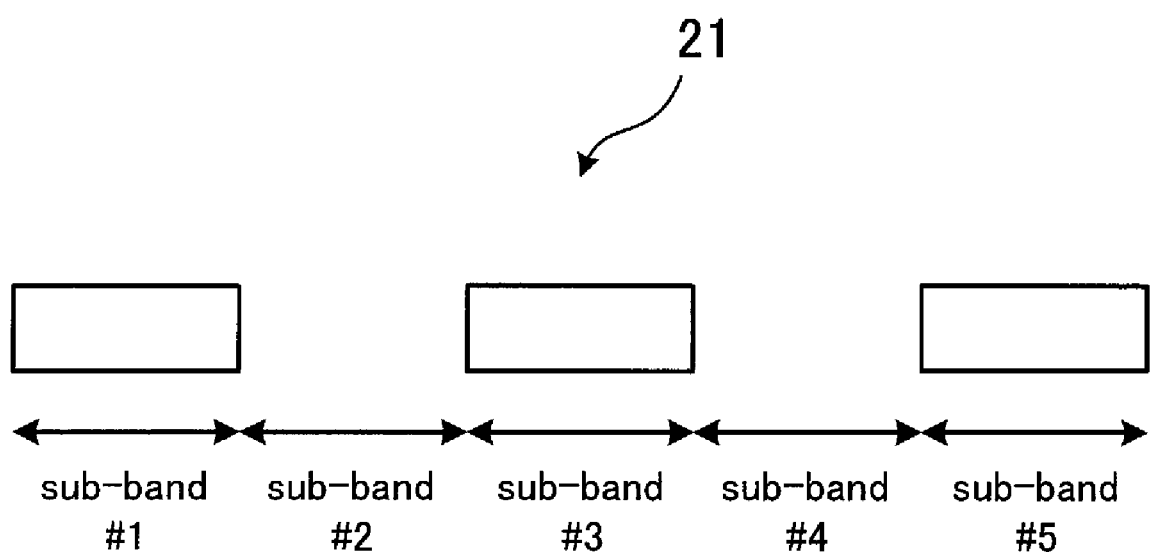
FIG. 9 is a diagram illustrating a request signal for wireless resource assignment in which a plurality of sub-bands discontinuously range.

FIG. 9 is a diagram illustrating a request signal for wireless resource assignment using a plurality of sub-bands which discontinuously range. As illustrated in FIG. 9, the terminal transmits to the base station a request signal for wireless resource assignment 21 using a plurality of sub-bands which discontinuously range.

The base station measures the communication quality of each of the sub-bands #1, #3, and #5 on the basis of a pilot signal contained in the request signal for wireless resource assignment 21. The base station assigns to the terminal one of the sub-bands #1, #3, and #5 for the terminal to perform uplink transmission.

In addition, the base station can estimate the communication quality of the sub-bands which are not assigned to the request signal for wireless resource assignment 21 by linear interpolation or the like on the basis of the communication quality of the sub-bands assigned to the request signal for wireless resource assignment 21. For example, the base station obtains the communication quality of the sub-band #2 from the average of the communication quality of the sub-band #1 and the communication quality of the sub-band #3. Therefore, the base station can assign to the terminal a sub-band having satisfactory communication quality among all the sub-bands #1 to #5 including the sub-bands #2 and #4 the communication quality of which is estimated as above.

Further, the terminal can determine one or more of the plurality of sub-bands through which the request signal for wireless resource assignment is to be transmitted. For example, the specification requirements and/or performance of an RF circuit and the like allow use of all the sub-bands #1 to #5 in some cases, and limit the use of sub-bands to the sub-bands #1 to #3 in other cases. Therefore, the terminal determines the sub-bands through which the request signal for wireless resource assignment is to be transmitted, within the range of sub-bands which is initially determined by the hardware constraints in the terminal as above.

Next, the second embodiment of the present invention is explained in detail with reference to drawings. In the second embodiment, a provision is made for coping with change of the optimum sub-band accompanied by variations in the propagation environment which occur after uplink data transmission is started.

For example, the terminal starts data transmission by use of the sub-band assigned by the base station, and continues transmission of an individual reference signal (such as a pilot) through the sub-band. However, the terminal does not transmit a reference signal through the other sub-bands, so that the base station cannot determine whether or not the communication quality of the sub-bands which are not assigned to the terminal is satisfactory for the terminal. Therefore, there is a fear that the wireless resources are not efficiently used according to the communication quality in the frequency domain, i.e., the frequency-domain scheduling is not efficiently performed. In consideration of the above circumstances, according to the second embodiment, while data is transmitted, the sub-band used in the data transmission is changed in turn so as to correspond to the optimum sub-band which varies with the variations in the propagation environment.

Figure 10:
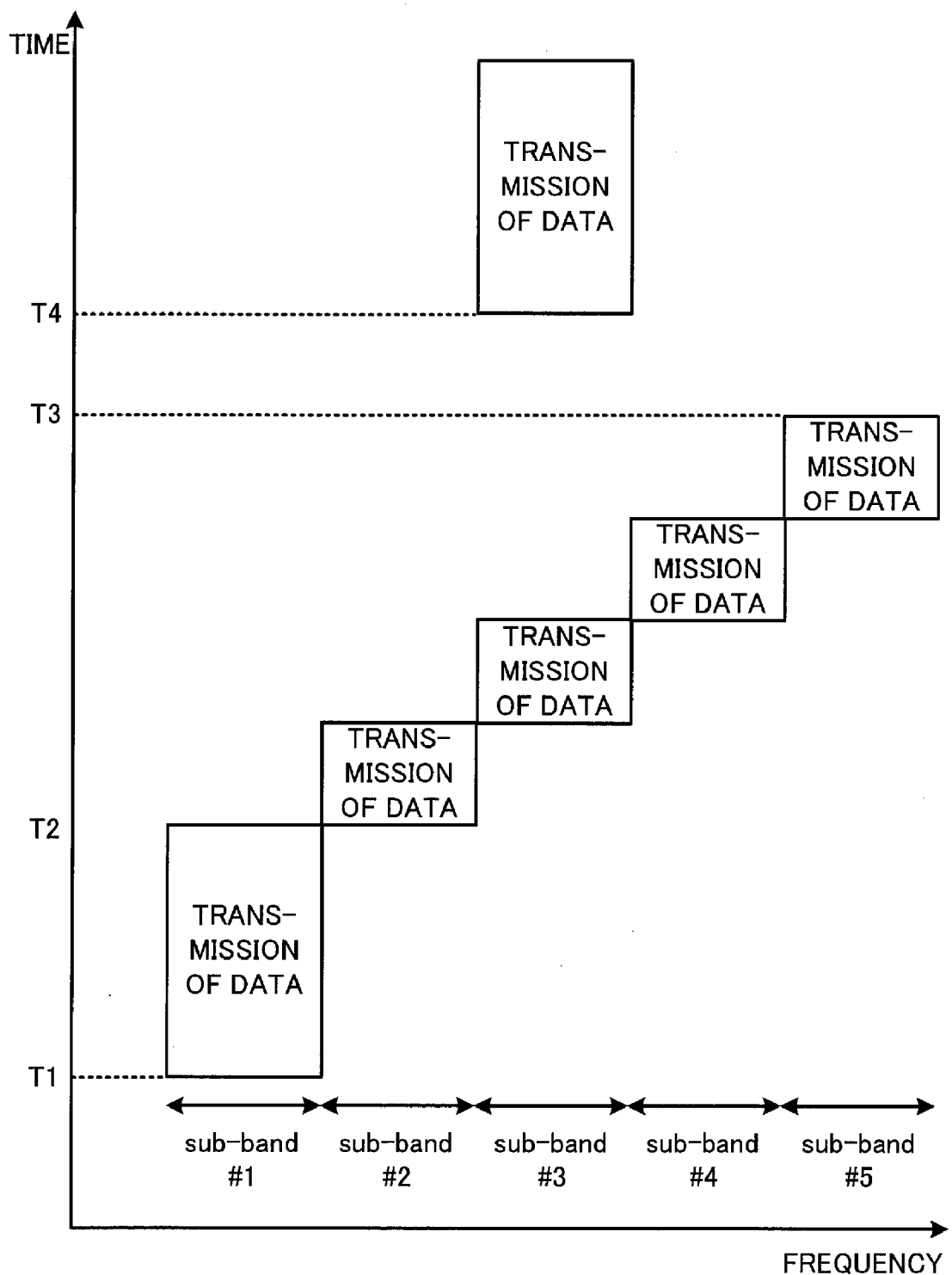
FIG. 10 is a diagram provided for explaining reassignment of a sub-band to a terminal by a base station.

FIG. 10 is a diagram provided for explaining reassignment of a sub-band to the terminal by the base station. FIG. 10 shows relationships between the timings and the frequencies of signals transmitted from the terminal to the base station. In FIG. 10, the abscissa corresponds to the frequency, and the ordinate corresponds to the time. In the example of FIG. 10, it is assumed that the terminal transmits a request signal for wireless resource assignment to the base station, and the sub-band #1 is initially assigned to the terminal.

As illustrated in FIG. 10, the terminal transmits data to the base station through the sub-band #1 at time T1.

A hopping transmission interval is set in the terminal. In the hopping transmission interval, the sub-band is changed while data is transmitted. When a predetermined time elapses, the terminal goes into a hopping mode, and the sub-band is changed while data is transmitted. While the terminal is in the hopping mode, the base station reselects a sub-band so that the communication quality for the terminal is improved, and reinforms the terminal of the sub-band to be used.

For example, as illustrated in FIG. 10, the terminal goes into the hopping mode at time T2, and then the sub-band used in the data transmission is changed in turn from the sub-band #1 through the sub-band #5 until the time T3.

The base station measures the communication quality of each sub-band on the basis of an individual pilot contained in data transmitted from the terminal through the sub-band and received by the base station. Then, in a change time from time T3 to T4, the base station assigns to the terminal a sub-band having the highest communication quality, and informs the terminal of the sub-band through the downlink.

The terminal transmits data to the base station by use of the sub-band newly assigned by the base station. FIG. 10 shows an example in which the sub-band #3 is assigned to the terminal.

Next, transmission and reception of data which are performed between the terminal and the base station are explained below with reference to a sequence diagram.

Figure 11:
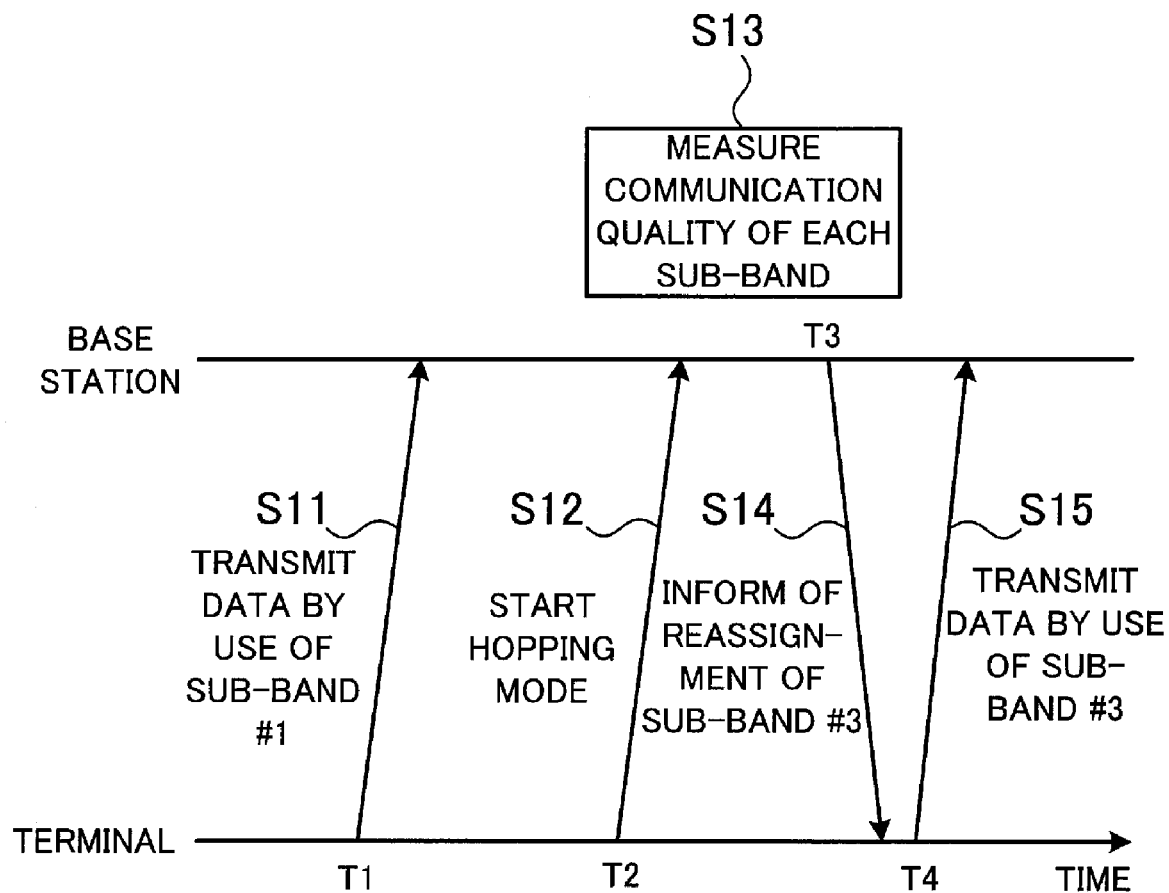
FIG. 11 is a sequence diagram of a terminal and a base station.

FIG. 11 is a sequence diagram of the terminal and the base station.

<Step S11> The terminal transmits data to the base station at time T1 by use of the sub-band #1 assigned by the base station.

<Step S12> The terminal goes into the hopping mode at time T2, and changes the sub-band for use from the sub-band #2 through the sub-band #5 in turn while transmitting data.

<Step S13> While the base station is in the hopping mode, the base station measures the communication quality of each sub-band on the basis of the pilot contained in the data received from the terminal through each sub-band.

<Step S14> The base station reassigns such a sub-band that the communication quality for the terminal is improved. The base station informs the terminal of the reassigned sub-band #3.

<Step S15> The terminal transmits data to the base station by use of the sub-band #3 assigned by the base station.

Although the explanations with reference to FIGS. 10 and 11 are made for the single terminal, more than one terminal may exist.

Figure 12:
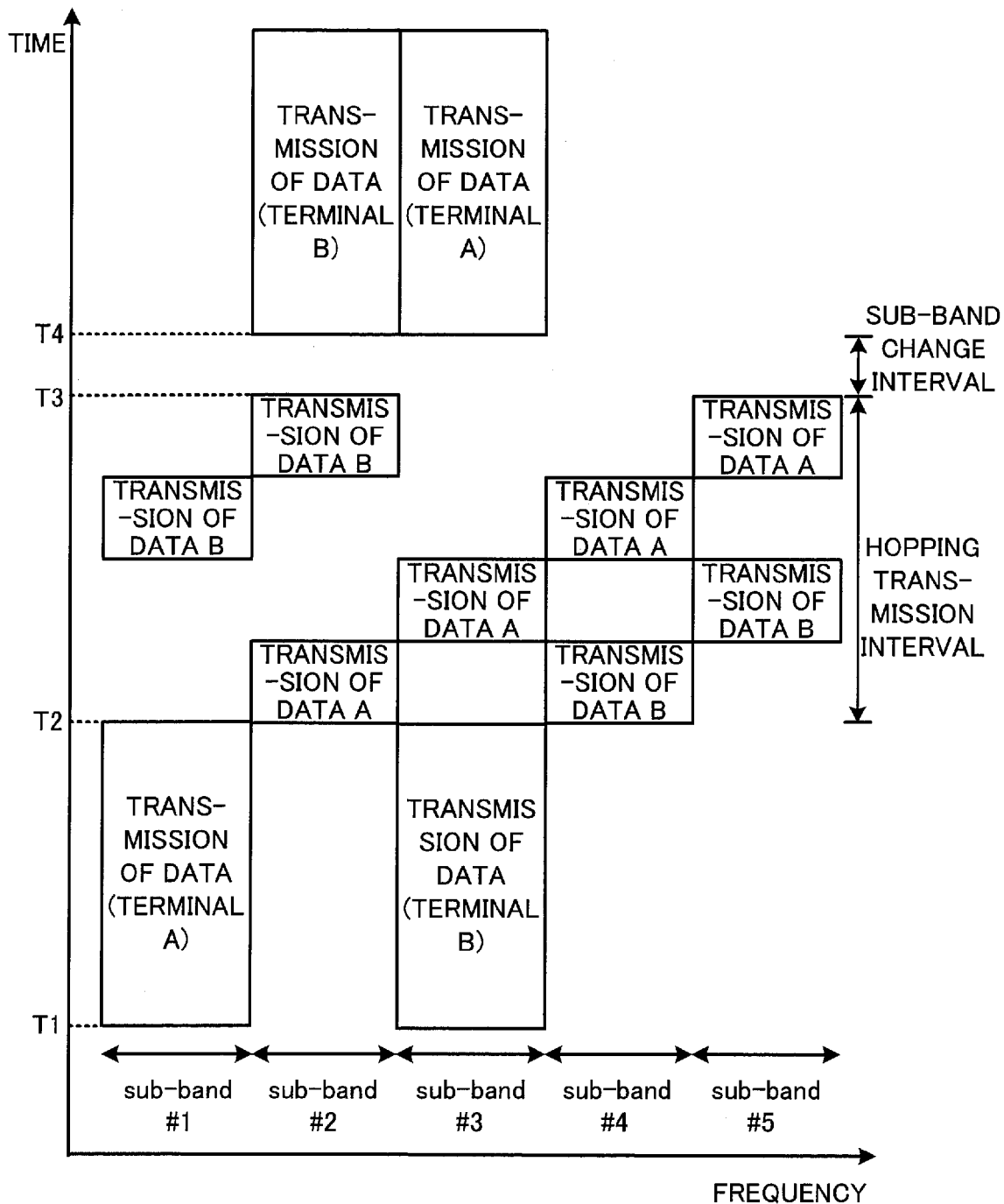
FIG. 12 is a diagram provided for explaining reassignment of sub-bands to a plurality of terminals by a base station.

FIG. 12 is a diagram provided for explaining reassignment of sub-bands to a plurality of terminals by the base station. FIG. 12 shows relationships between the timings and the frequencies of signals transmitted from two terminals A and B to the base station. In FIG. 12, the abscissa corresponds to the frequency, and the ordinate corresponds to the time. In the example of FIG. 12, it is assumed that each of the terminals A and B transmits a request signal for wireless resource assignment to the base station, and the sub-bands #1 and #3 are initially assigned to the terminals.

As illustrated in FIG. 12, at time T1, the terminal A transmits data to the base station by use of the sub-band #1, and the terminal B transmits data to the base station by use of the sub-band #3.

In the terminals A and B, a hopping transmission interval (or a hopping mode) is set. In the hopping transmission interval, the sub-band is changed while data is transmitted. When a predetermined time elapses, the terminals A and B go into the hopping mode, and the sub-band is changed while data is transmitted. For example, the terminal A is changed in turn through #2, #3, #4, and #5 while data is transmitted, and the terminal B is changed in turn through #4, #5, #1, and #2 while data is transmitted. The hopping transmission interval (from the time T2 to T3) is common to all the terminals (A and B).

The base station reselects such a sub-band for each of the terminals A and B that the communication quality for each terminal is improved, on the basis of the data which are transmitted as above and received by the base station while the terminals are in the hopping mode. During the sub-band change interval (from time T3 to T4), the base station reinforms the terminals A and B of the sub-bands to be used by the terminals A and B.

The terminals transmit data to the base station by use of the sub-bands assigned by the base station, where the sub-bands have satisfactory communication quality. In the example of FIG. 12, the sub-band #3 is assigned to the terminal A, and the sub-band #2 is assigned to the terminal B.

As explained above, the terminals change the sub-bands for use and transmit data containing the pilot to the base station while the terminals are in the hopping mode. Therefore, the base station can reselect the sub-bands which realize satisfactory communication quality for the terminals. Thus, the terminals can continue the communication through sub-bands having satisfactory communication quality even when the sub-bands having satisfactory communication quality are changed due to the environmental variations.

When contention occurs in assignment of a sub-band, for example, the base station preferentially assigns the sub-band to a terminal for which the communication quality of the sub-band is higher. For example, in the case where the priority of a first terminal for a sub-band is determined to be next to the priority of a second terminal for the sub-band, the base station assigns to the first terminal another sub-band the communication quality of which is the second highest for the first terminal.

Next, the third embodiment of the present invention is explained in detail with reference to drawings. Although the data transmission is discontinued (in the sub-band change interval) for the reassignment of the sub-band according to the second embodiment, according to the third embodiment, the interval in which the data transmission is discontinued is utilized as an interval for transmitting a request signal for wireless resource assignment from a new terminal.

Figure 13:
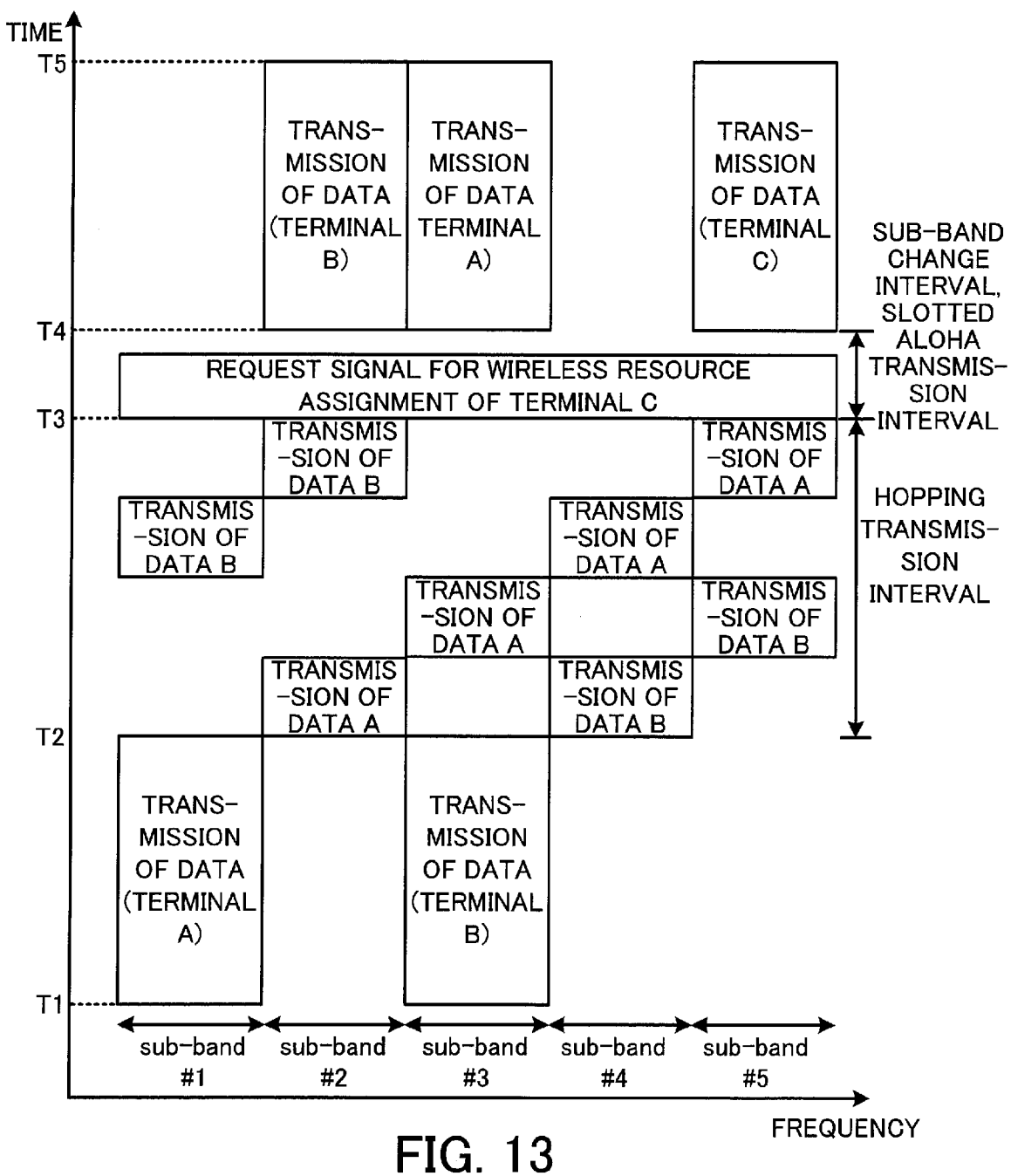
FIG. 13 is a diagram provided for explaining reassignment of sub-bands to terminals by a base station.

FIG. 13 is a diagram provided for explaining reassignment of sub-bands to terminals by the base station. FIG. 13 shows relationships between the timings and the frequencies of signals transmitted from two terminals A and B to the base station, and a relationship between the timing and the frequency of a signal in the case where a terminal C transmits to the base station a request signal for wireless resource assignment by utilizing the sub-band change interval. In FIG. 13, the abscissa corresponds to the frequency, and the ordinate corresponds to the time. In the example of FIG. 13, it is assumed that each of the terminals A and B transmits a request signal for wireless resource assignment to the base station, and the sub-bands #1 and #3 are initially assigned to the terminals A and B.

As illustrated in FIG. 13, at time T1, the terminal A transmits data to the base station by use of the sub-band #1, and the terminal B transmits data to the base station by use of the sub-band #3.

A hopping transmission interval is set in the terminals A and B. In the hopping transmission interval, the sub-band is changed while data is transmitted. When a predetermined time elapses, the terminals A and B go into a hopping mode, and the sub-band is changed while data is transmitted. For example, the terminal A is changed in turn through #2, #3, #4, and #5 while data is transmitted, and the terminal B is changed in turn through #4, #5, #1, and #2 while data is transmitted. The hopping transmission interval is common to all the terminals (A and B).

The base station reselects such a sub-band for each of the terminals A and B that the communication quality for the terminal is improved, on the basis of the data which are transmitted as above and received by the base station while the terminals are in the hopping mode. During the sub-band change interval (from time T3 to T4), the base station reinforms the terminals A and B of the sub-bands to be used by the terminals A and B.

The terminals transmit data to the base station by use of the sub-bands assigned by the base station, where the sub-bands have satisfactory communication quality. In the example of FIG. 13, the sub-band #3 is assigned to the terminal A, and the sub-band #2 is assigned to the terminal B.

At this time, the terminal C transmits to the base station a request signal for wireless resource assignment in the sub-band change interval. That is, the new terminal C utilizes the sub-band change interval as an interval for transmitting the request signal for wireless resource assignment. The request signal for wireless resource assignment is transmitted from the terminal to the base station in the sub-band change interval by using a random access protocol (for example, the Slotted ALOHA protocol) or the like. For example, the sub-band change interval may be referred to as the Slotted ALOHA transmission interval.

When the base station receives the request signal for wireless resource assignment from the terminal C, the base station measures the communication quality of the pilot signal in each of the sub-bands #1 to #5, where the pilot signal is contained in the request signal for wireless resource assignment and spreads over the entire bandwidth of the request signal for wireless resource assignment. The base station assigns a sub-band having satisfactory communication quality to the terminal C, which transmits the request signal for wireless resource assignment. The base station informs the terminal C of the sub-band assigned to the terminal C, by transmitting a sub-band-assignment signal.

When the terminal C receives the sub-band-assignment signal from the base station, the terminal C transmits data to the base station by using the assigned sub-band, which is indicated by information contained in the sub-band-assignment signal. In the example of FIG. 13, the sub-band #5 is assigned to the terminal C.

As explained above, a new terminal can transmit the request signal for wireless resource assignment by using the sub-band change interval.

Hereinbelow, examples of the hardware constructions of the terminals and the communication device are explained.

Figure 14:
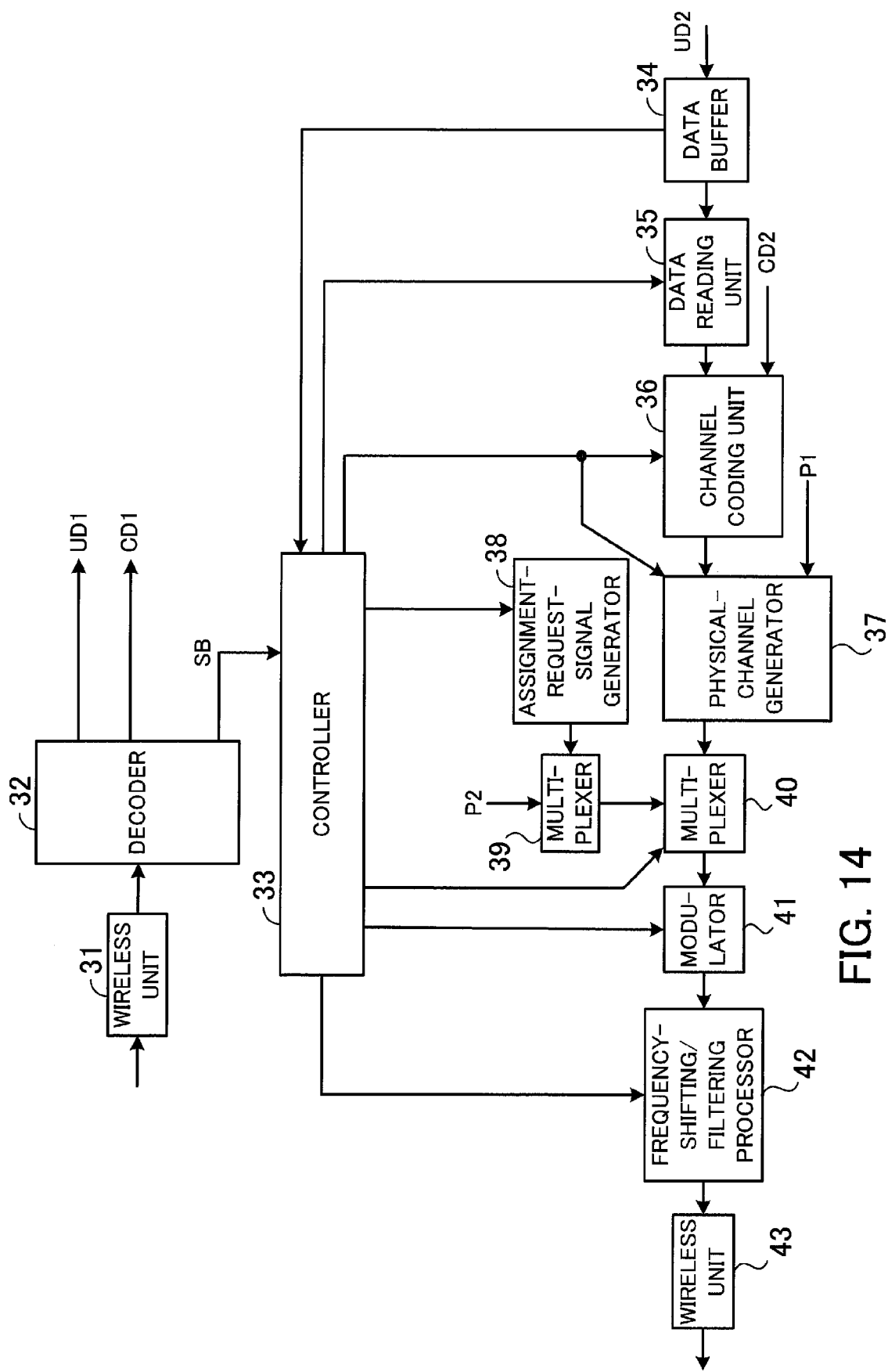
FIG. 14 is a diagram illustrating an example of a hardware structure of a terminal.

FIG. 14 is a diagram illustrating an example of a hardware structure of a terminal. As illustrated in FIG. 14, each terminal comprises wireless units 31 and 43, a decoder 32, a controller 33, a data buffer 34, a data reading unit 35, a channel coding unit 36, a physical-channel generator 37, an assignment-request-signal generator 38, multiplexers 39 and 40, a modulator 41, and a frequency-shifting/filtering processor 42.

The wireless unit 31 receives wireless signals from the base station.

The decoder 32 decodes the wireless signals received by the wireless unit 31. User data UD1 and control-information data CD1, which are contained in the decoded wireless signals, are outputted to an internal circuit. In addition, sub-band information SB, which is contained in a decoded sub-band-assignment signal and indicates a sub-band assigned to the terminal, is outputted to the controller 33.

The controller 33 performs predetermined operations for controlling the respective parts of the terminal. For example, the controller 33 controls the change of the sub-band in the hopping mode, and the transmission of the request signal for wireless resource assignment in the sub-band change interval.

User data UD2 which is to be transmitted from the internal circuit to the base station is stored in the data buffer 34.

The data reading unit 35 reads out the user data UD2 from the data buffer 34 by an amount necessary for transmission to the base station based on an instruction from the controller 33.

The above user data UD2 (read out from the data reading unit 35) and control-information data CD2 are inputted into the channel coding unit 36. The channel coding unit 36 generates a parity bit for the user data UD2 and the control-information data CD2.

The user data UD2, the control-information data CD2, the parity bit, and a pilot P1 are inputted into the physical-channel generator 37. The physical-channel generator 37 combines these inputs so as to produce data to be transmitted (to the base station). The pilot P1 inputted into the physical-channel generator 37 is a pilot individually attached to each piece of data transmitted.

The assignment-request-signal generator 38 generates a request signal for wireless resource assignment according to an instruction from the controller 33. For example, the assignment-request-signal generator 38 generates the request signal for wireless resource assignment when transmission of data is started.

The multiplexer 39 multiplexes a pilot P2 and the above request signal for wireless resource assignment generated by the assignment-request-signal generator 38.

The multiplexer 40 multiplexes the request signal for wireless resource assignment outputted from the multiplexer 39 and the data to be transmitted which is outputted from the physical-channel generator 37. This multiplexing operation is not performed all the time. For example, this multiplexing operation is performed when the amount of data transmitted to the base station is changed during the operation in the hopping mode and the changed amount of data is required to be transmitted. In this case, even when the amount of data transmitted to the base station or the like is changed, the base station can correctly recognize the changed amount of transmitted data.

The modulator 41 modulates the data to be transmitted and the request signal for wireless resource assignment outputted from the multiplexer 40, by a modulation technique, for example, QPSK (quadrature phase shift keying).

The frequency-shifting/filtering processor 42 performs processing for frequency shifting and filtering of the data to be transmitted and the request signal for wireless resource assignment, under the control of the controller 33. The frequency-shifting/filtering processor 42 removes unnecessary frequency components from the data to be transmitted, and limits the frequencies of the data to be transmitted to the frequencies of the sub-band. In addition, the frequency-shifting/filtering processor 42 modifies the request signal for wireless resource assignment so as to spread over the entire bandwidth, and removes unnecessary frequency components from the request signal for wireless resource assignment.

The wireless unit 43 wirelessly transmits to the base station the data to be transmitted which is outputted from the frequency-shifting/filtering processor 42.

Next, a hardware construction in the base station for performing scheduling of terminals is explained below.

Figure 15:
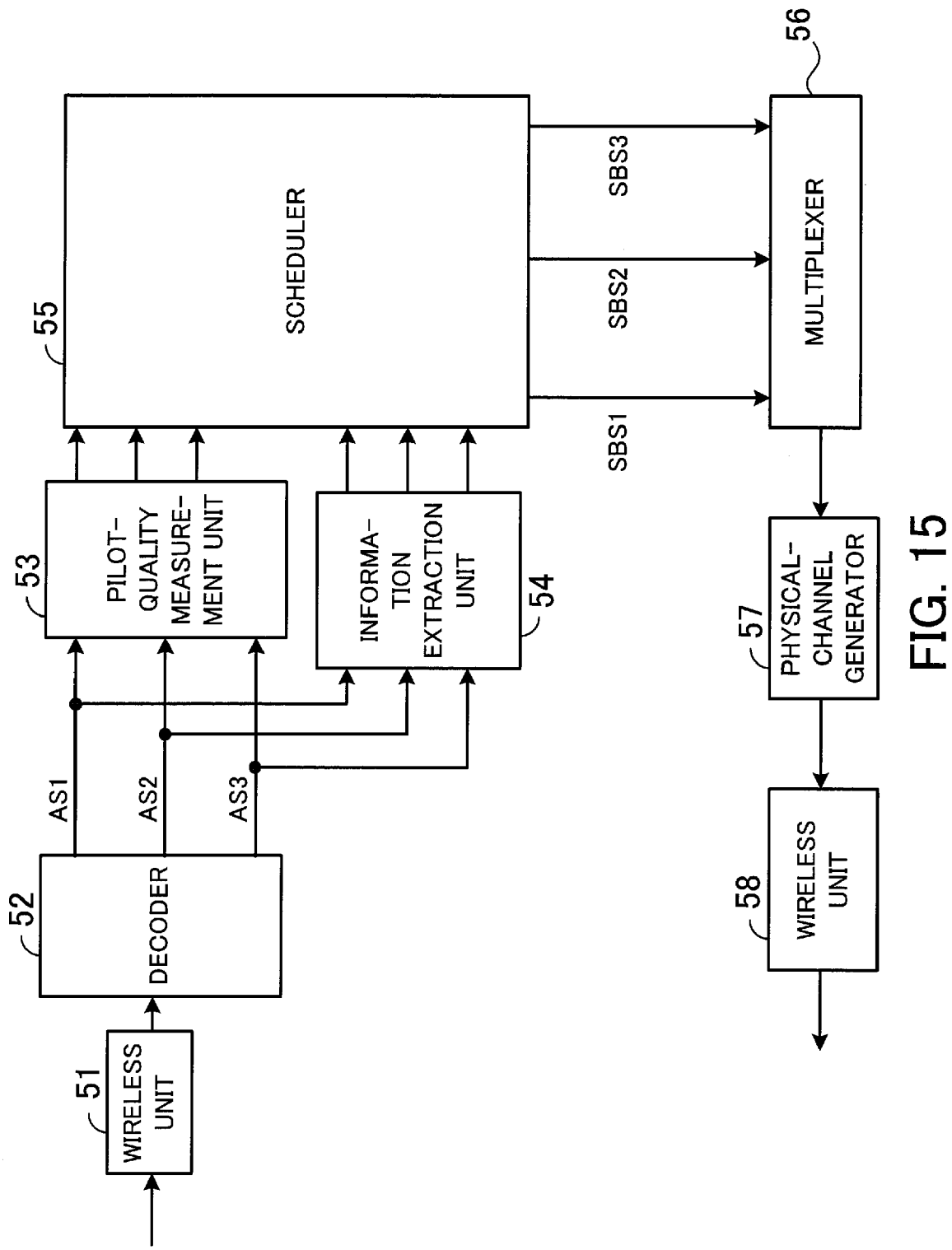
FIG. 15 is a diagram illustrating an example of a hardware structure in a base station.

FIG. 15 is a diagram illustrating an example of the hardware structure in the base station. As illustrated in FIG. 15, the base station comprises wireless units 51 and 58, a decoder 52, a pilot-quality measurement unit 53, an information extraction unit 54, a scheduler 55, a multiplexer 56, and a physical-channel generator 57.

The wireless unit 51 receives wireless signals from the base station.

The decoder 52 decodes the wireless signals received by the wireless unit 51. The decoded wireless signals include request signals for wireless resource assignment from the terminals. In the following explanations, it is assumed that the base station receives the request signals for wireless resource assignment from the three terminals A to C, and the request signals for wireless resource assignment received from the three terminals A, B, and C are respectively represented by AS1, AS2, and AS3.

The pilot-quality measurement unit 53 measures the communication quality of the wireless communication through the respective sub-bands on the basis of the pilots contained in the request signals for wireless resource assignment AS1 to AS3.

The information extraction unit 54 extracts information on the amount of requested wireless resources (e.g., the amount of data transmitted from a terminal) which is contained in each of the request signals for wireless resource assignment AS1 to AS3.

The scheduler 55 assigns to each of the terminals A to C a sub-band having satisfactory communication quality for the terminal and a time in which the terminal is allowed to perform wireless communication, on the basis of the communication quality of the respective sub-bands for the respective terminals A to C (measured by the pilot-quality measurement unit 53) and the amount of requested wireless resources (extracted by the information extraction unit 54). The scheduler 55 outputs to the multiplexer 56 sub-band-assignment signals containing information on the sub-bands assigned to the terminals A to C. In the following explanations, the sub-band-assignment signals for the terminals A, B, and C are respectively represented by SBS1, SBS2, and SBS3.

The multiplexer 56 multiplexes the sub-band-assignment signals SBS1, SBS2, and SBS3 outputted from the scheduler 55.

The physical-channel generator 57 arranges the sub-band-assignment signals SBS1, SBS2, and SBS3 (multiplexed by the multiplexer 56) to make data to be transmitted to the base station.

The wireless unit 58 modulates the data to be transmitted which is outputted from the physical-channel generator 57, and wirelessly transmits the modulated data to the terminals A to C.

The terminals and the communication devices in the first to third embodiments can be realized by the hardware constructions explained above.

The communication device according to the present invention receives from the terminal the reference signal spreading over the plurality of sub-bands, measures the communication quality of each of the plurality of sub-bands, and assigns one of the plurality of sub-bands to the terminal on the basis of the measured communication quality. Therefore, the communication device can assign to the terminal a sub-band having satisfactory communication quality.

The terminal according to the present invention transmits to the communication device the reference signal spreading over the plurality of sub-bands, receives the sub-band-assignment information on one of the plurality of sub-bands assigned to the terminal by the communication device on the basis of the reference signal, and transmits data to the communication device through the sub-band assigned by the communication device. Therefore, the terminal can perform communication with the communication device through a sub-band having satisfactory communication quality.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication device for performing wireless communication with a terminal, comprising:
   a reference-signal reception unit which receives from said terminal a pilot signal spreading over a plurality of sub-bands for evaluation of communication quality of the sub-bands;
   a communication-quality measurement unit which measures communication quality of each of the plurality of sub-bands on a basis of the pilot signal that is received; and
   a sub-band assignment unit which assigns a first single sub-band among the plurality of sub-bands to the terminal on a basis of the measured communication quality, for the terminal to perform wireless communication with the communication device in non-hopping mode; and
   wherein:
   the sub-band assignment unit causes the terminal to perform wireless communication in the non-hopping mode by using the first single sub-band for a predetermined time, and thereafter to switch from the non-hopping mode to hopping mode to continue the wireless communication by using the plurality of sub-bands in turn,
   the communication-quality measurement unit re-measures communication quality of each of the plurality of sub-bands based on the pilot signal received during the wireless communication in the hopping mode, and
   the terminal stops the hopping mode upon completion of one round of using the plurality of sub-bands, and the sub-band assignment unit re-assigns a second single sub-band to the terminal which is selected from among the plurality of sub-bands based on the re-measured communication quality and causes the terminal to continue the wireless communication in non-hopping mode by using the second single sub-band.

2. The communication device according to claim 1, wherein said plurality of sub-bands discontinuously range.

3. The communication device according to claim 2, wherein said communication-quality measurement unit estimates communication quality of one or more zones between said plurality of sub-bands.

4. The communication device according to claim 1, wherein said reference-signal reception unit receives from a new terminal another pilot signal spreading over said plurality of sub-bands for a predetermined time after the plurality of sub-bands are used in turn.

5. A terminal for performing wireless communication with a communication device, comprising:
   a reference-signal transmission unit which transmits to said communication device a pilot signal spreading over a plurality of sub-bands for evaluation of communication quality of the sub-bands;
   a sub-band-assignment-information reception unit which receives sub-band-assignment information indicating a first single sub-band assigned to the terminal by the communication device on a basis of the communication quality of the pilot signal; and
   a data transmission unit which performs wireless communication in non-hopping mode by using the first single sub-band for a predetermined time, switches thereafter from the non-hopping mode to hopping mode to continue the wireless communication by using the plurality of sub-bands in turn, and stops the hopping mode upon completion of one round of using the plurality of sub-bands;
   wherein:
   the sub-band-assignment-information reception unit receives another piece of sub-band-assignment information which indicates a second single sub-band re-assigned by the communication device based on communication quality of each of the plurality of sub-bands re-measured during the wireless communication in the hopping mode, and
   the data transmission unit, after the stopping of the hopping mode, further continues the wireless communication in non-hopping mode by using the second single sub-band that is re-assigned by the communication device.

6. The terminal according to claim 5, wherein said reference-signal transmission unit transmits said pilot signal to said communication device, and said plurality of sub-bands discontinuously range.

7. The terminal according to claim 5, wherein said reference-signal transmission unit transmits said pilot signal to said communication device during a transmission time during which said communication device transmits said sub-band-assignment information to another terminal.

* * * * *